Patented Dec. 22, 1925.

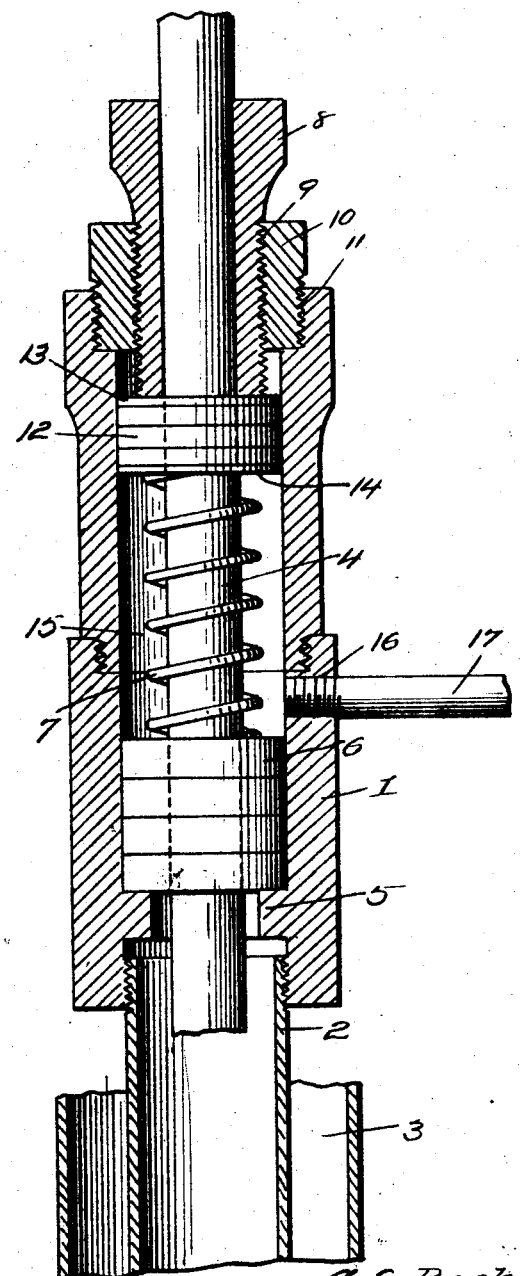

1,566,462

UNITED STATES PATENT OFFICE.

GEORGE S. BASHLINE, OF WYNONA, OKLAHOMA.

STUFFING BOX.

Application filed December 11, 1924. Serial No. 755,242.

*To all whom it may concern:*

Be it known that I, GEORGE S. BASHLINE, a citizen of the United States, residing at Wynona, in the county of Osage and State of Oklahoma, have invented certain new and useful Improvements in a Stuffing Box, of which the following is a specification.

This invention relates to improvements in stuffing boxes and more particularly to an improvement over the stuffing box embodied in my copending application bearing Serial No. 743,609.

One of the important objects of the present invention is to provide a stuffing box which will prevent possibility of any oil leaking upwardly and passing around the upper portion of the pump rod during the reciprocating movement of the latter.

Other objects and advantages of this invention will become apparent during the course of the following description.

In the accompanying drawing forming a part of this specification and in which like numerals designate like parts throughout the same:

The figure represents a view partly in side elevation and partly in section of the stuffing box embodying my invention showing the same mounted on the upper end of the oil well tubing and positioned around the reciprocating piston rod.

In the drawing, wherein for the purpose of illustration is shown the preferred embodiment of my invention, the numeral 1 designates a cylindrical casing or barrel, which includes upper and lower sections detachably secured together. The lower section is threaded on the upper end of the usual oil well tubing 2. The usual casing which extends around the tubing is illustrated at 3. The piston rod of the oil well pumping mechanism is indicated at 4 and the same extends longitudinally and centrally through the casing 1 and is adapted for reciprocatory movement therethrough in the usual manner. An annular flange 5 is formed on the inner wall of the lower section of the casing 1 adjacent the lower end thereof and the inner periphery of the flanges spaced from the piston rod 4 so as not to interfere with the operation thereof.

Disposed within the lower section of the casing and encircling the piston rod 4 are the packing rings 6. For the purpose of normally holding the packing rings in the lower section of the casing, a coil spring 7 is provided, the same encircling the piston rod 4 and having the lower end thereof in engagement with the uppermost of the packing rings. The tension of the coil springs 7 is regulated by an elongated sleeve 8. This sleeve is disposed around the piston rod 4 and extends into the upper section of the casing 1. The sleeve is externally threaded as illustrated at 9 for cooperation with the internally threaded bore of a suitable bushing 10, the latter being threaded into the upper section of the casing 1 as illustrated at 11. The threaded connection between the sleeve 8 and the bushing 10 permits the adjustment of the sleeve.

Encircling the piston rod 4 in the upper section of the casing 1 are the packing rings 12. A washer 13 is interposed between the uppermost of the packing rings 12 and the bottom of the sleeve 8 and a similar washer 14 is disposed between the lowermost of the packing rings 12 and the upper end of the coil spring 7. It is obvious that when the sleeve 8 is turned in one direction, the same will move the packing rings 12 and the washers downwardly so that the tension of the coil spring 7 may be regulated. The purpose of the packing rings will hereinafter be more fully described.

The portion of the casing between the lower packing ring 6 and the upper packing rings 12 provide a trap 15 in which is collected the oil which may leak past the lower packing ring during the pumping operation of the well. In order that the oil which is entrapped in the chamber 13 may be discharged therefrom into a suitable receptacle, the casing 1 is provided with a threaded opening 16, the same being located at a point above the lower packing rings 6 as is clearly illustrated in the drawing. A pipe 17 is threaded into the opening 16 for permitting the entrapped oil to be discharged from the chamber 15 without any loss of the same. When the oil well is not in operation, the pipe 17 may be removed and a suitable threaded plug inserted into the threaded opening 16 for closing the same.

The provision of the upper packing rings 12 will prevent any possibility of the oil which has leaked past the lower packing ring from leaking through the sleeve 8 and around the upper portion of the piston rod 4, thus causing all of the oil to be entrapped in the chamber 15 which has leaked past the lower packing ring and as the pump rod reciprocates, the oil will be caused to be discharged out through the pipe 17.

By constructing the casing in sections, the stuffing box may be readily disassembled for gaining access to the packing rings disposed in the respective sections of the casing.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A stuffing box for the piston rod of an oil well comprising a casing including an upper and a lower section, the lower section threaded at its lower end for engaging the upper end of the usual oil well tubing, an annular flange formed on the inner wall of the lower section adjacent the lower end thereof, a bushing threaded in the upper end of the upper section, a sleeve threaded in the bushing, packing rings in said casing adapted to encircle the piston rod and disposed above the flange, additional packing rings in the casing adapted to encircle the piston rod and disposed below the sleeve, a coil spring encircling the rod for holding the packing rings in engagement with the flange and sleeve respectively, said sleeve providing a means for regulating the tension of the coil spring, said casing having a drain opening provided therein at a point above the lower packing rings for discharging the oil which leaks past the lower packing rings and collects in the casing, the upper packing rings preventing the passing of the oil upward around the upper portion of the rod.

In testimony whereof I affix my signature.

GEORGE S. BASHLINE.